(12) United States Patent
Sylvia et al.

(10) Patent No.: US 7,225,533 B2
(45) Date of Patent: Jun. 5, 2007

(54) APPARATUS FOR FEEDING ELONGATED MEMBER INTO CONDUIT

(75) Inventors: Joseph Sylvia, Cranston, RI (US); Ross Smith, Richmond, RI (US); Larry Shelton, Warwick, RI (US); Daniel Upton, Smithfield, RI (US)

(73) Assignee: Neptco Incorporated, Pawtucket, RI (US)

( * ) Notice: Subject to any disclaimer, the term of this patent is extended or adjusted under 35 U.S.C. 154(b) by 212 days.

(21) Appl. No.: 10/285,769

(22) Filed: Nov. 1, 2002

(65) Prior Publication Data
US 2003/0106199 A1  Jun. 12, 2003

Related U.S. Application Data

(63) Continuation of application No. 60/335,014, filed on Nov. 2, 2001.

(51) Int. Cl.
*B23P 19/00* (2006.01)
*B65H 61/00* (2006.01)

(52) U.S. Cl. ............... 29/819; 29/252; 254/134.3 CL; 254/134.4

(58) Field of Classification Search ............... 29/819, 29/820, 241, 252, 272; 257/134.3 CL, 134.4
See application file for complete search history.

(56) References Cited

U.S. PATENT DOCUMENTS 4,783,054 A * 11/1988 Morel et al. ............. 254/134.4
6,170,804 B1 * 1/2001 Allen ..................... 254/134.4
6,364,290 B1 * 4/2002 Barker .................... 254/134.4
6,386,512 B1 * 5/2002 Pecot et al. ............. 254/134.4
6,561,488 B1 * 5/2003 Walker .................... 254/134.4

FOREIGN PATENT DOCUMENTS

| WO | 98-12588 | * | 3/1998 |
| WO | 99-34492 | * | 7/1999 |

* cited by examiner

*Primary Examiner*—Jermie E. Cozart
(74) *Attorney, Agent, or Firm*—Mintz, Levin, Cohn, Ferris, Glovsky and Popeo, P.C.

(57) ABSTRACT

The invention provides an apparatus and methods for applying a material to a cable or into a conduit. The apparatus includes a hinged housing for coupling to a portion of a cable and/or a conduit. The apparatus is configured as a portable housing that is particularly suited for use in the field to apply a material to an existing underground cable or conduit or to a new or relocated cable or conduit during installation. The hinged housing permits the apparatus to couple to a portion of a cable or a portion of a conduit without splicing the cable or the conduit or removing the cable. When coupled to a cable or a conduit, the housing defines a chamber into which a material is inserted. Compressed air is supplied to the chamber to force the material into an innerduct of the conduit and to pull the material therethrough, applying the material to the cable and/or the conduit. Various materials can be applied to occupied and unoccupied conduit using the apparatus including a detectable tape, a service or tracer wire, a cable or a narrow-diameter cable duct sized for insertion into a conduit.

38 Claims, 15 Drawing Sheets

APPARATUS FOR FEEDING ELONGATED MEMBER INTO CONDUIT

PRIORITY TO PRIOR PATENT APPLICATIONS

This application claims priority under 35 U.S.C. § 119(e) to U.S. provisional patent application Ser. No. 60/335,014, filed on Nov. 2, 2001, incorporated herein by reference.

FIELD OF THE INVENTION

The invention is directed to an apparatus and methods for applying media to a cable or into a conduit.

BACKGROUND OF THE INVENTION

Utility and telecommunications companies have for some time been installing all dielectric cable, e.g., fiber optic cable, to upgrade cable systems and to overcome the problems associated with bonding and grounding a metallic presence to cable. Dielectric cable systems, however, present new problems in locating previously installed underground systems for upgrade and repair. Dielectric cable cannot be remotely located once buried underground.

Methods to locate buried cable systems include pothole drilling. Pothole drilling involves exploratory drilling that can be slow and costly, and can often pose risks of damage or destruction of buried cable. In addition, pothole drilling typically must rely on cable installation records that may be lost, are inaccurate or are no longer useful due to landmark changes.

Whenever possible, permanent service or tracer wires, e.g., copper service wires, and other detectable media are installed alongside underground cable to provide a detectable means for remotely locating specific cables and systems. Installing detectable media, however, can only be performed when a cable system is being upgraded, re-routed and/or moved from a particular site. In addition, installation of service and tracer wires is a slow and costly procedure that often requires exploratory drilling to locate cables and cable systems.

SUMMARY OF THE INVENTION

An object of the invention is to provide an apparatus for applying a material, e.g., a detectable material, to a cable or into a conduit, e.g., an underground cable or conduit. Another object of the invention is to provide an apparatus for applying an elongated material, e.g., a detectable tape, a cable or a narrow cable duct, into an innerduct of a conduit. A further object of the invention is to provide methods for applying a material to a cable or into a conduit.

In general, in one aspect, the invention provides an apparatus for applying an elongated member to a conduit. The apparatus includes a housing constructed and arranged to enclose a portion of the conduit. The housing includes a first coupling housing and a second coupling housing. The first coupling housing is pivotally connected to the second coupling housing such that the housing may be closed around the portion of the conduit; the first coupling housing and the second coupling housing when closed defining a chamber, the chamber having a first open end to substantially conform to a first portion of the conduit; and a gas supply assembly on the housing configured to supply gas under pressure to the chamber from a gas source; and an inlet assembly on the housing configured to supply the elongated member to the chamber.

Implementations of the invention may include one or more of the following features. The chamber further includes a second open end spaced from the first open end to substantially conform to a portion of a cable extending through the conduit. The first open end is aligned with the second open end. The apparatus further includes a closing mechanism constructed and arranged to removably and securely connect the first coupling housing to the second coupling housing. The apparatus further comprising a seal disposed adjacent to the first open end between an interior surface defining the chamber and an outer surface of the first portion of the conduit, the seal being configured and sized to fill a space between the interior surface and the outer surface of the first portion of the conduit. In one aspect, the seal includes a gasket shaped on one surface to mate with the interior surface of the chamber and shaped on an opposing surface to mate with the outer surface of the first portion of the conduit. The gasket provides a substantially airtight seal. In another aspect, the seal includes an adapter having one or more grooves configured in an outer surface, each groove being aligned with a rim configured in the interior surface of the chamber and sized such that the groove receives the rim. Alternatively, the seal includes an adapter configured to seat in the space between the interior surface and the outer surface of the first portion of the conduit having a smooth external surface shaped to mate with the interior surface defining the chamber, and further including a terminal flange to connect the adapter to a perimeter defining the first open end. The adapter further includes an inner surface opposite to the outer surface configured to mate with a shape of the outer surface of the first portion of the conduit. The inner surface includes one or more ridges configured to grasp the outer surface of the first portion of the conduit. The adapter is further configured to secure the housing at the first open end to the first portion of the conduit. The adapter is further configured to align with and to connect to an open flush terminal end of the first portion of the conduit. The adapter is further configured to mate with a coupling to align the adapter with an open flush terminal end of the first portion of the conduit and to removably connect the adapter to the open flush terminal end. The adapter further includes a gasket between its inner surface and the outer surface of the first portion of the conduit to form a substantially airtight seal.

Implementations of the invention may further include one or more of the following features. The apparatus further comprising a seal disposed adjacent to the second open end between an interior surface defining the chamber and an outer surface of the portion of the cable, the seal being configured and sized to fill a space between the interior surface and the outer surface of the portion of the cable. The seal includes a gasket shaped on one surface to mate with the interior surface of the chamber and shaped on an opposing surface to mate with the outer surface of the portion of the cable. The gasket secures the housing at the second open end to the portion of the cable. The gasket includes a substantially airtight seal.

Implementations of the invention may still further include one or more of the following. The gas supply assembly is disposed anterior to the inlet assembly. The gas supply assembly is disposed and configured such that the gas supply assembly is in fluid communication with the chamber and further disposed and configured to deliver pressurized gas to the chamber at an angle. The inlet assembly includes a terminal assembly disposed and configured at a terminal portion of the inlet assembly and in fluid communication with the chamber, the terminal assembly being configured to act as a chamber to permit introduction of the elongated member into the chamber. The terminal assembly includes being further configured to prevent loss of air from the inlet assembly. The terminal assembly includes being further configured to contain the elongated member and to permit the elongated member to slide through the inlet assembly into the chamber.

The first coupling housing includes interior surfaces configured to mate with interior surfaces of the second coupling housing to form a seal between the first coupling housing and the second coupling housing. The seal includes a substantially airtight seal.

The elongated member includes a detectable material, a detectable tape having a metallic component integrated therein, a cable or a narrow cable duct.

In another aspect, an apparatus for applying an elongated member to a conduit is provided. The apparatus includes a housing constructed and arranged to enclose a portion of the conduit, the housing including a first coupling housing and a second coupling housing, the first coupling housing being pivotally connected to the second coupling housing such that the housing may be closed around the portion of the conduit; the first coupling housing and second coupling housing when closed defining a chamber; the chamber having a first open end to substantially conform to a first portion of the conduit; and means for supplying the elongated member to the chamber.

A method for applying an elongated member to a conduit is provided. The method includes preparing a portion of a conduit to receive the elongated member such that the prepared portion permits the elongated member to be threaded into an interior of the conduit; enclosing the prepared portion of a conduit with a housing having a chamber; sealing the chamber to prevent loss of air from the chamber; inserting the elongated member into a first site of the housing in fluid communication with the chamber; supplying pressurized air to the chamber at a second site of the housing anterior to the first site of the housing such that when the pressurized air is supplied to the chamber the elongated member is pulled into the chamber; and maintaining a supply of pressurized air to force the elongated member from the chamber into the prepared portion of the conduit.

In another aspect, an apparatus for stranding a cable into a conduit. The apparatus including a housing constructed and arranged to enclose a portion of the conduit, the housing including a first coupling housing and a second coupling housing, the first coupling housing being pivotally connected to the second coupling housing such that the housing may be closed around the portion of the conduit; the first coupling housing and the second coupling housing when closed defining a chamber, the chamber having a first open end to substantially conform to a first portion of the conduit and having a second open end spaced from the first open end to substantially conform to a second portion of the conduit; a gas supply assembly on the housing configured to supply gas under pressure to the chamber from a gas source; and an inlet assembly coupled to one of the first open end and the second open end to supply the cable into the conduit.

Various aspects of the invention may provide one or more of the following advantages. An apparatus can be provided for applying a material, e.g., a detectable material, a detectable tape, a metallic service or tracer wire or an elongated material, to a cable, e.g., an existing, previously installed underground cable or a new or relocated cable before installation. An apparatus can be provided for applying a material, e.g., a cable or a narrow, "mini" cable duct, into a conduit, e.g., an existing, previously installed conduit or a new or relocated conduit. An apparatus for applying a material to a cable or into a conduit can be configured for portability and for ease of use in the field, e.g., requires only one operator, for installation. A detectable tape can be applied to an underground dielectric cable wherein the tape comprises a woven tape, including one or more metallic conductors compatible with commercial detection equipment. The detectable tape can be applied to an underground dielectric cable to help detect the cable. The tape generates a detectable electromagnetic field when an electric signal is applied or transmitted to the cable by a remote transmitter. The electric and/or magnetic field that consequently emanates from the metallic conductor is detectable by receiving equipment to determine the location of the cable.

A reliable apparatus and an efficient method for applying a material, e.g., a detectable tape, a service or tracer wire, a cable or a cable duct, to a cable or into a conduit can be provided using compressed air to apply the material over the cable or into an innerduct of the conduit. An apparatus can be provided constructed and arranged to apply a material over a long distance or span of a cable or a conduit. The apparatus can be provided that helps to eliminate or to at least minimize/reduce a need to thread and/or pull a material over a cable or through a conduit in the field.

An apparatus can be provided that can apply a material to a cable or into a conduit over a long distance or span, e.g., over 2,500 feet. The apparatus can be constructed and arranged to maintain a sufficient pressurization within the apparatus to force a material over a cable or into a conduit. The apparatus can be further configured to help eliminate or to at least minimize/reduce loss of air during use of the apparatus.

These and other advantages of the invention, along with the invention itself, will be more fully understood after a review of the following figures, detailed description, and claims.

DETAILED DESCRIPTION OF PREFERRED EMBODIMENTS

An apparatus is provided for applying different types of media to a cable. The apparatus is constructed and arranged to apply an elongated material, e.g., a detectable tape, a service or tracer wire, a cable or a narrow "mini" cable duct sized to contain a cable for inclusion in a conduit innerduct. The apparatus is configured to couple with, e.g., to clamp to or to mount with, a new or existing cable or conduit. The apparatus is particularly suited for applying a detectable tape to a previously installed, underground cable. The apparatus couples to a portion of a conduit that has been prepared to expose a portion of a cable contained within the conduit innerduct. Application of compressed gas, e.g., air, to the apparatus when coupled to the conduit pressurizes an interior of the apparatus. Pressurization of the apparatus causes the elongated material threaded through the apparatus to be applied into the innerduct between the conduit and the cable. The apparatus thereby can install elongated material into a conduit without a need to cut or to remove an existing, installed cable contained therein. Other embodiments are within the scope of the invention.

Figure 1:
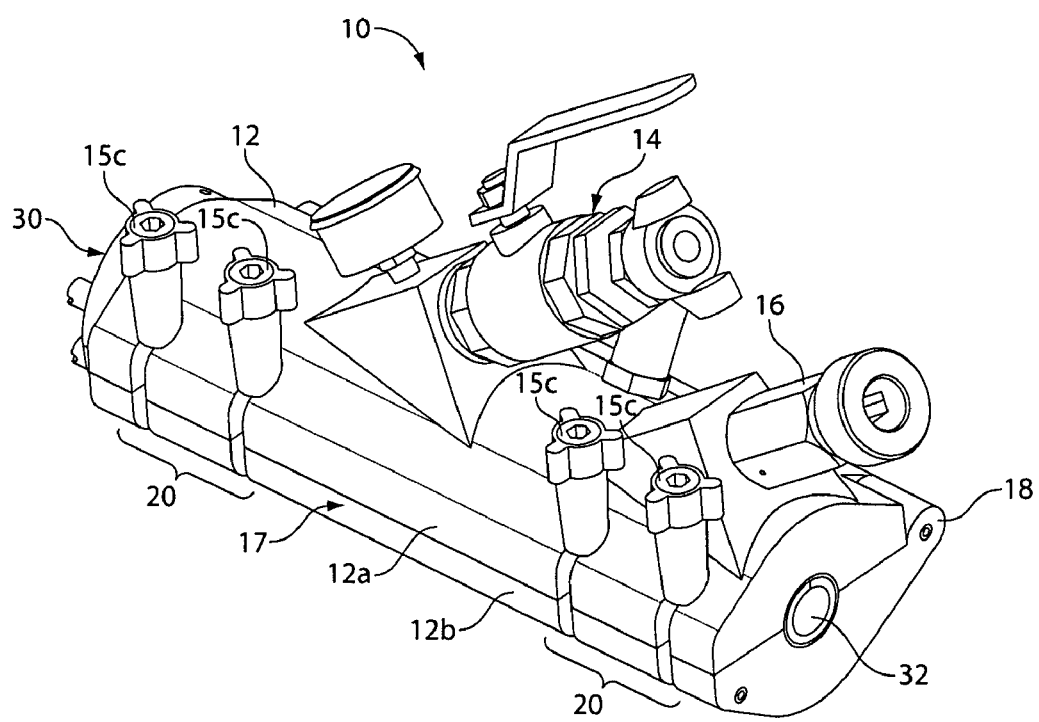
FIG. 1 is a perspective view of an apparatus for applying a material to a cable or into a conduit.
Figure 2:
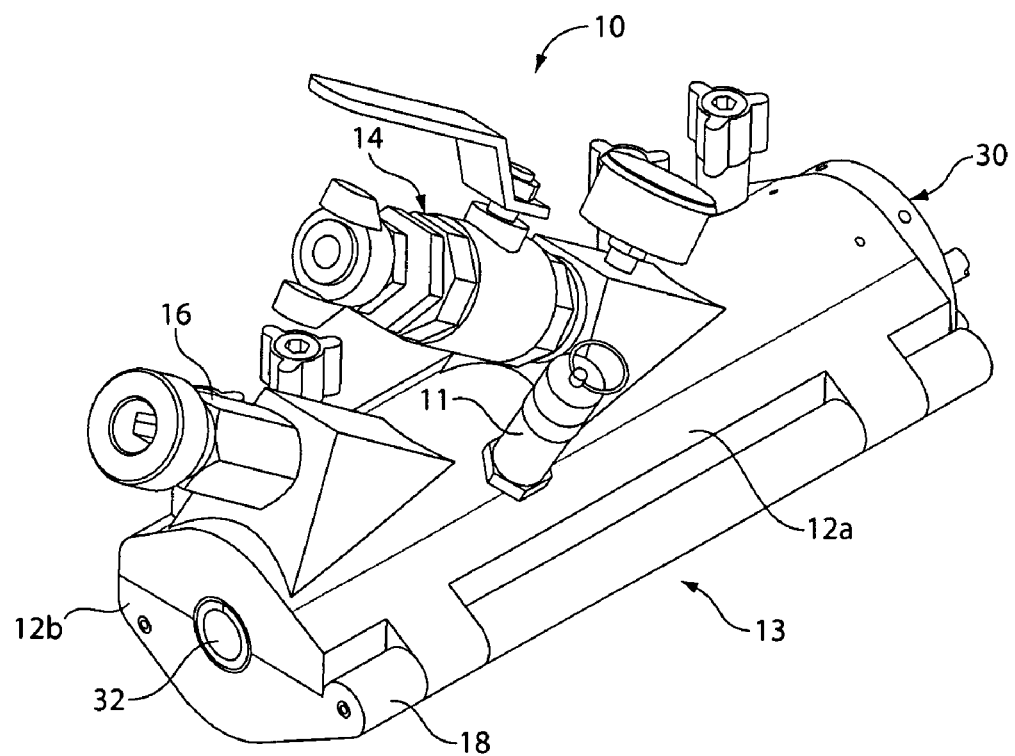
FIG. 2 is a perspective view of the apparatus shown in FIG. 1 from an opposite side.

Referring to FIGS. 1–2, in one aspect, an apparatus 10 is provided comprising a housing 12, an air valve assembly 14 to supply pressurized air to the housing 12, and an inlet valve assembly 16 to supply an elongated material, e.g., a detectable tape, to the housing 12 for application to a cable. The apparatus further includes movable connectors 18 to permit the housing to open and to close, and a closing mechanism 20 to secure the housing 12 in a closed position, e.g., when the housing 12 is coupled to a conduit.

The housing 12 includes two coupling halves, a first or top coupling half 12a and a second or bottom coupling half 12b. The top half 12a is movably connected to the bottom half 12b by one or more movable connectors 18, e.g., hinges, disposed along a first side 13 of the housing 12. The top and the bottom halves 12a and 12b are disposed and configured to separate along a second side 17 of the housing 12 opposite to the first side 13. The hinges 18 permit the top and the bottom halves 12a and 12b to pivot along the first side 13 to open the housing 12 along the second side 17. The hinged housing 12 allows the apparatus 10 to open and to clamp over and around a conduit. The hinged housing 12 can be positioned over a prepared site of a conduit, e.g., a portion of a conduit jacket or casing cut and/or removed to expose a cable contained therein, to couple with the conduit for application of an elongated material into an innerduct of the conduit.

The housing 12 is further configured to mount to an open terminal end of a conduit. As described below in further detail, the housing 12 is configured to define an innerduct open end 30 at one end of the housing 12. The innerduct open end 30 defines a circular cross-section configured to permit the innerduct open end 30 to receive a portion of the conduit substantially adjacent to its terminal end and to surround the portion of the conduit such that the housing mounts the conduit. Alternatively, the innerduct open end 30 can be aligned with and butted against the open terminal end of the conduit to mount the housing 12 to the open end of the conduit. In this context, a coupling can be used that is disposed and configured to align the innerduct end 30 with and to couple the innerduct end 30 to the open end of the conduit such that the innerduct end 30 and the open end are in fluid communication.

Figure 4:
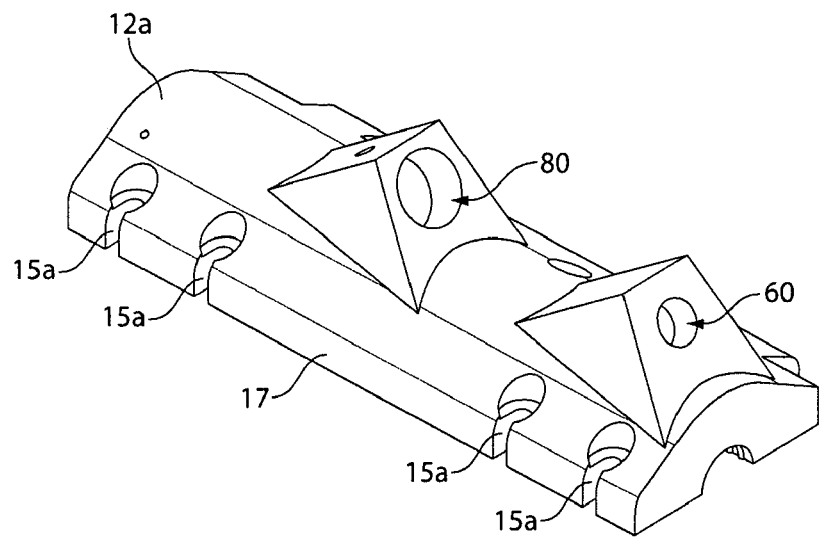
FIG. 4 is a perspective view of a portion of a first or top coupling half of a housing of the apparatus shown in FIGS. 1–3.
Figure 5:
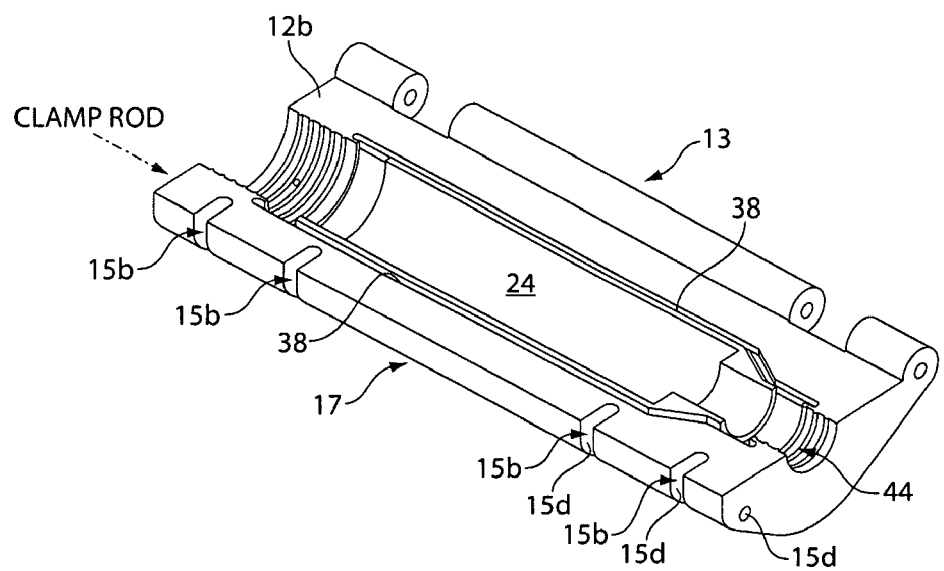
FIG. 5 is a perspective interior view of a portion of a second or bottom coupling half of the housing of the apparatus shown in FIGS. 1–2.

Referring to FIGS. 4–5, the top coupling half 12a serves as a top portion of the housing 12 and provides one or more notches 15a, e.g., U-shaped notches, along the second side 17 of the housing 12. Similarly, the bottom coupling half 12b serves as a bottom portion of the housing 12 and provides one or more notches 15b, e.g., U-shaped notches, along the second side 17 of the housing 12. When the housing 12 is in a closed position, the notches 15a of the top half 12a substantially align with the notches 15b of the bottom half 12b. The top and the bottom notches 15a and 15b are disposed and configured to operatively couple to the securing mechanism 20 to secure the housing 12. As shown in FIG. 1, the securing mechanism 20 can include one or more screw-type threaded connectors 15c configured such that each top notch 15a and its corresponding bottom notch 15b can receive one of the threaded connectors 15c.

As shown in FIG. 5, the bottom notches 15b can provide a pair of bores 15d, each bore 15d configured in one side of the notch 15b opposite to and aligned with the other bore 15d. The bores 15d of the bottom notches 15b are disposed and configured to receive a clamp rod (not shown). The clamp rod can be machined to provide one or more threaded bores (not shown) to receive a threaded portion of each screw-type threaded connector 15c. The bores 15d of the bottom notches 15b receive the clamp rod and position the clamp rod such that when the top notches 15a align with the bottom notches 12b, each bore of the clamp rod is aligned with one of the top and one of the bottom notches 15a and 15b. Each bore of the clamp rod can thereby receive the threaded portion of one of the threaded connectors 15c. Each threaded connector 15c is threaded into one of the top notches 15a through one of the clamp rod bores and into one of the bottom notches 15b to secure the top half 12a to the bottom half 12b. The configuration and arrangement of the notches 15a and 15b, the threaded connectors 15c, the bores 15d and the clamp rod permit the housing 12 to be substantially secured around a conduit, e.g., movement or slippage of the housing 12 around the conduit is eliminated or at least minimized. Movement is eliminated or at least minimized to the extent that any movement or slippage of the housing 12 does not affect performance of the apparatus 10. The invention, however, is not limited to the configuration and arrangement of the notches 15a and 15b, the threaded connectors 15c, the bores 15d and the clamp rod as described herein, but may incorporate other configurations and devices to removably and securely connect the top half 12a to the bottom half 12b.

Figure 3:
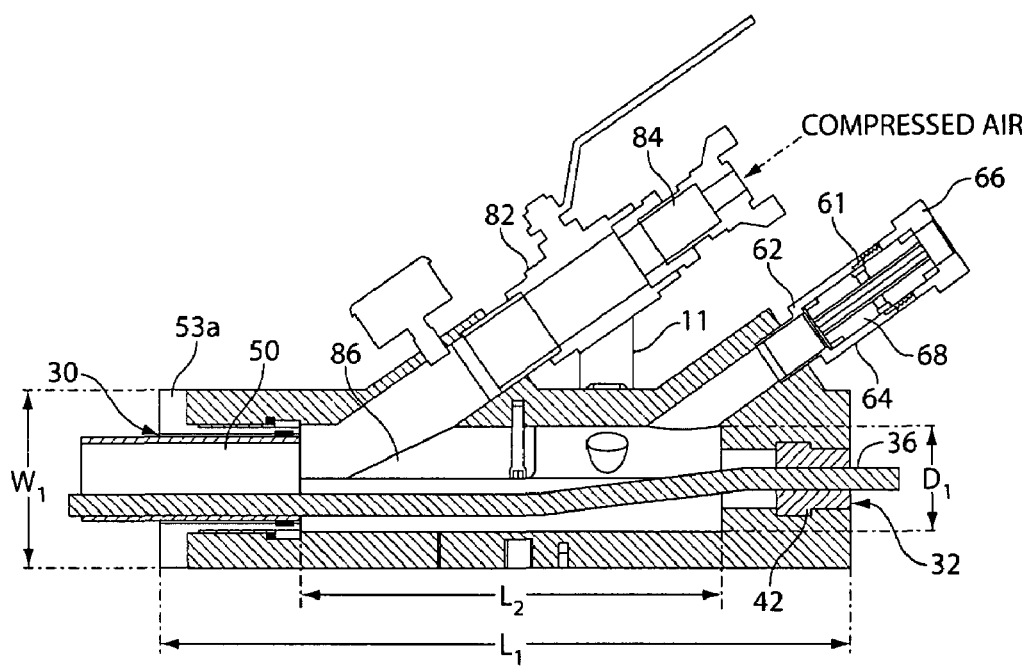
FIG. 3 is a cross-sectional side view of the apparatus shown in FIGS. 1–2 coupled to a conduit containing a cable.

Referring to FIG. 3, the housing 12 can have dimensions to facilitate portability and to provide ease of use of the apparatus 10 in the field. In this aspect of the invention, the housing 12 includes a length $L_1$ in a range of from about 6 inches to about 36 inches, and a width $W_1$ in a range of from about 3 inches to about 8 inches. It is understood, however, that the apparatus 10 according to the invention, is not limited with respect to the length $L_1$ and the width $W_1$, of the housing 12 and can include the housing 12 with different dimensions to accommodate different conduit sizes, e.g., widths, and different cable system designs.

The housing 12 is constructed of a material suitable for use in applying detectable materials to new cable and previously installed underground cable during installation and/or relocation. The material is suitable for withstanding moisture, and is lightweight for facilitating portability and ease of use in the field, e.g., easily installed and operated by one operator. Suitable materials include, but are not limited to, metals, e.g., aluminum and stainless steel, plastic, e.g., reinforced plastic, and combinations thereof.

As shown in FIG. 3, when the housing 12 is in a closed position with the top half 12a mated with the bottom half 12b, the top and the bottom halves 12a and 12b define an interior chamber 28 within the housing 12. The chamber 28 extends lengthwise along at least a portion of the length $L_1$ of the housing 12. The chamber 28 terminates at opposite ends of the housing 12 such that the chamber 28 defines a first or innerduct open end 30 and a second or cable open end 32.

Figure 6:
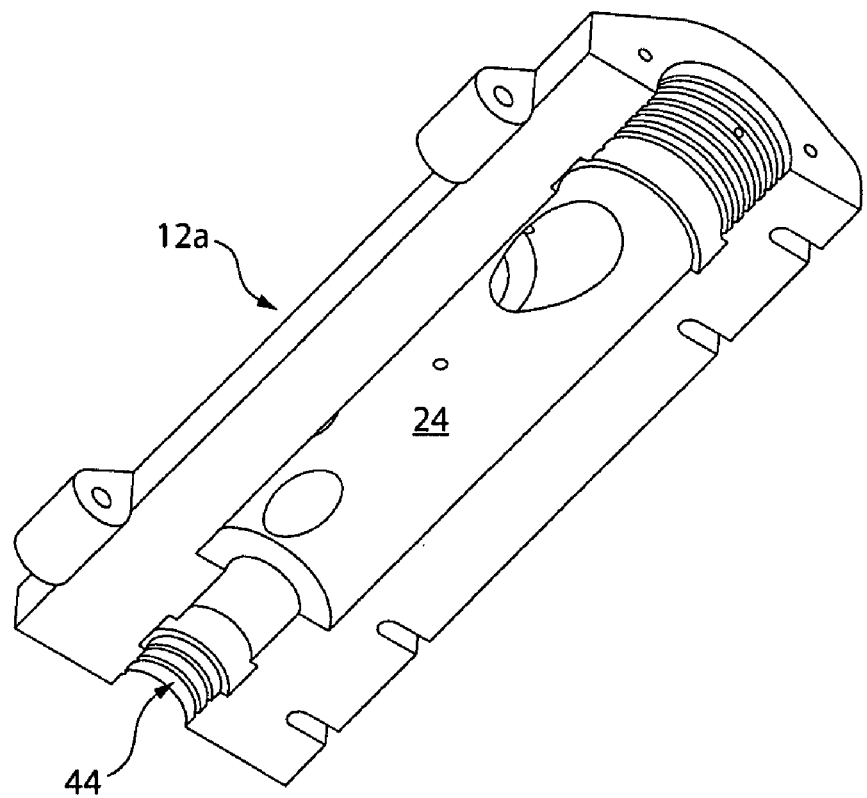
FIG. 6 is a perspective interior view of a portion of the first or top coupling half of the housing shown in FIGS. 1–2.

Referring also to FIGS. 5–6, each of the coupling halves 12a and 12b has an interior surface 24 configured to conform to or mate with a substrate, e.g., a portion of an outer surface of a conduit, a conduit jacket or casing, and/or a cable. The interior surface 24 of each coupling half 12a and 12b defines a shape, e.g., a curved cross-section or a semi-circular cross-section, to permit the interior surfaces 24 of the top and bottom halves 12a and 12b to conform to or to mate with the substrate. As shown in FIGS. 5–6, the interior surface 24 has a semi-circular cross-section. When the housing 12 is in a closed position, the interior surfaces 24 define the chamber 28 having a substantially circular-shaped cross-section and further define the innerduct open end 30 and a cable open end 32 at each end of the chamber 28. The innerduct open end 30 and the cable open end 32 each have a substantially circular-shaped cross-section. As shown in FIGS. 1 and 3, the circular-shaped cross-section of the innerduct end 30 permits the innerduct end 30 to clamp over and around a portion of a conduit 34. The circular-shaped cross-section of the cable end 32 permits the cable end 32 to clamp over and around a portion of an exposed cable 36.

The innerduct open end 30 is further configured to mount the housing 12 to a conduit. The innerduct end 30 can define a shape and a size to receive a portion of a conduit adjacent to an open terminal end of the conduit. The innerduct end 30 receives the portion of the conduit to thereby couple the housing 12 to the open terminal end of the conduit. The innerduct end 30 is also configured to permit the innerduct end 30 to align with and butt against the open terminal end to connect the innerduct end 30 via a coupling. The coupling can be disposed and configured to align the innerduct end 30 with and to connect the innerduct end 30 to the open end of the conduit such that the innerduct end 30 and the open end of the conduit are in fluid communication. The apparatus 10 can thereby apply an elongated material directly into an innerduct of the conduit through the open terminal end 30 of the conduit.

Referring to FIG. 3, the chamber 28 has an inner diameter $D_1$ of from about 1 in. to about 4 in., and a length $L_2$ of from about 6 in. to about 30 in. It is understood, however, that the housing 12 can provide the chamber 28 with different dimensions to accommodate different sizes, e.g., widths, of conduit and cable designs. In this aspect, the housing 12 defines the chamber 28 with a diameter $D_1$ having sufficient size to allow the apparatus 10 to be used with a wide range of conduit sizes and designs, providing the apparatus 10 with versatility in applying detectable materials to different types of cable. As described herein in further detail, the apparatus 10 can include one or more adapters seated in the chamber 28 to help accommodate the differences between the dimensions of the chamber 28 and a conduit and/or a cable to which the apparatus 10 is clamped and secured to for installation of a detectable tape.

Figure 7A:
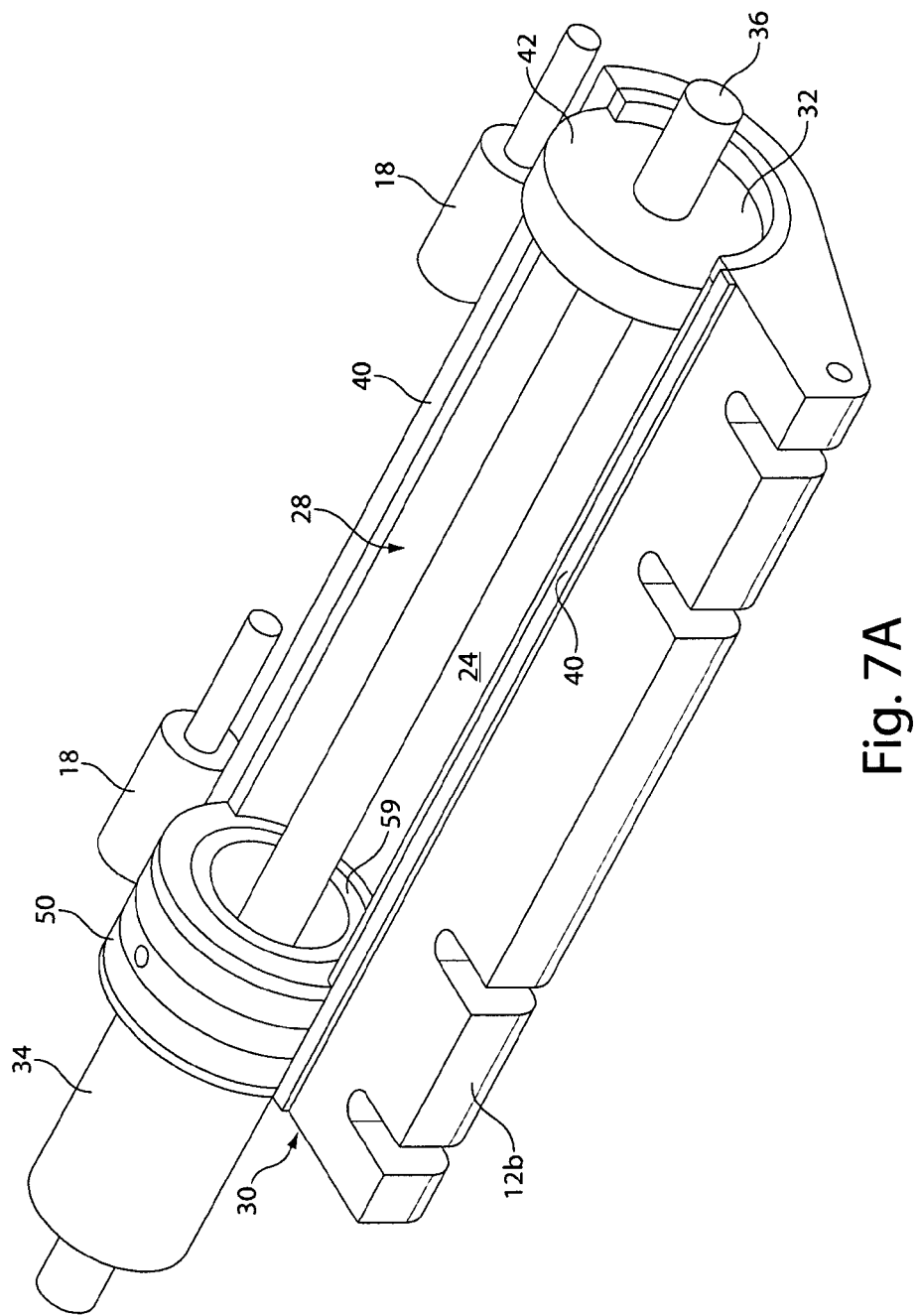
FIG. 7A is a perspective interior view of a portion of the second or bottom coupling half of the housing shown in FIGS. 1–2 with an adapter coupled to a portion of the conduit containing the cable.

Referring to FIGS. 5 and 7A, grooves 38 are configured in interior mating surfaces of the bottom coupling half 12b adjacent to the first and the second sides 13 and 17 of the housing 12. As shown in FIG. 5, a pair of grooves 38 is configured in a mating surface of the bottom half 12b with one groove 38 on each side of the interior surface 24. Each groove 38 extends substantially the length $L_1$ of the housing 12 and terminates at each end of the housing 12 adjacent to the innerduct end 30 and adjacent to the cable end 32. Each groove 38 is configured to receive an elongated gasket 40. The gasket 40 is preferably constructed of a deformable material suitable for conforming to a shape of the groove 38, such as, but not limited to, rubber, plastic, silicone, vinyl, other elastomeric materials or combinations thereof. When the housing 12 is in a closed position with the top half 12a mated to the bottom half 12b and the securing mechanism 20 is engaged, the top and the bottom halves 12a and 12b bias against the gaskets 40. The gaskets 40, thereby help to form substantially airtight seals, e.g., seals that prevent all, at least most of or a substantial portion of air within the chamber 28 from venting from the housing 12 to the atmosphere.

Referring to FIGS. 5–6, the top and the bottom halves 12a and 12b each include a channel 44 adjacent to the cable end 32 and the innerduct end 30 of the housing 12. The channel 44 is configured in the interior surface 24 and traverses the interior surface in a substantially perpendicular orientation to the innerduct end 30 and the cable end 32). Each channel 44 is configured, e.g., has a concave shape and a semi-circular cross-section, to receive a gasket 42, e.g., having a circular cylindrical shape and a semicircular cross-section or U-shape. The gasket 42 is constructed of material suitable for conforming to the shape of the channels 44 including but not limited to, rubber, plastic, silicone, vinyl, other elastomeric materials or combinations thereof. Alternatively, the gasket 42 is constructed of material suitable for providing strength and/or rigidity including, but not limited to, metals, e.g., aluminum. As shown in FIG. 3, when the housing 12 is clamped over and around a conduit and the securing mechanism 20 is engaged, the top and the bottom halves 12a and 12b bias against the gaskets 42. The gaskets 42 thereby help to form substantially airtight seals at the innerduct end 30 and the cable end 32, e.g., seals that prevent all, at least most of or a substantial portion of air within the chamber 28 from venting from the innerduct end 30 and from the cable end 32 to the atmosphere.

The substantially airtight seals, as described above, produced by the grooves 38, the channels 44 and the gaskets 40 and 42 help to eliminate or at least help to minimize air loss from the housing 12 when compressed air is delivered into the chamber 28 during use of the apparatus 10. The substantially airtight seals thereby help to maintain a pressure in the apparatus 10 within a desired range of pressure(s) and help to optimize the performance of the apparatus 10. In particular, the substantially airtight seals help to maintain a pressure in the apparatus 10 sufficient to apply or install a detectable material, e.g., a detectable tape, to a cable extending over a long distance or span of conduit, e.g., from about 50 feet to about 10,000 feet.

Figure 7B:
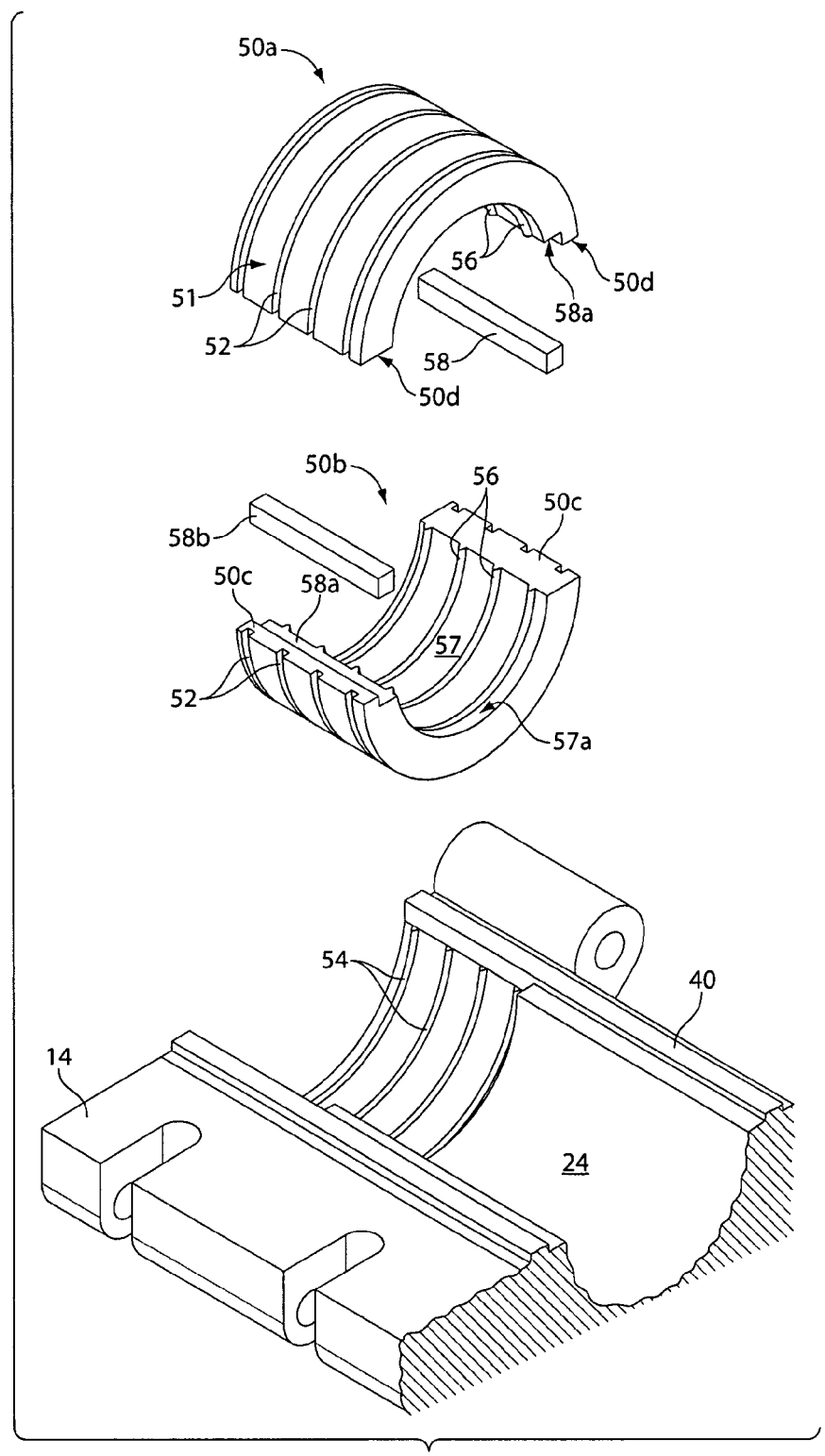
FIG. 7B is a perspective exploded view of the adapter shown in FIG. 7A.

Referring to FIGS. 7A–7B, and also referring to FIG. 3, the apparatus 10 further includes one or more adapters 50. In one aspect, the adapter 50 is disposed and configured such that it is received by the interior surface 24 and sits in the chamber 38 adjacent to the innerduct end 30. The adapter 50 includes two halves 50a and 50b. Each half 50a and 50b is configured, e.g., has a semi-circular cross-section, and is sized, e.g., has sufficient thickness or width, to substantially fill, e.g., leaves little or no room, a space created between the interior surface 24 and an outer housing of a conduit 34 when the housing 12 is clamped over and around the conduit 34.

Each half 50a and 50b of the adapter 50 provides one or more grooves 52 that are configured in an outer surface.51 of each half 50a and 50b to define one or more female fittings 52 on the outer surface 51 of the adapter 50. Each female fitting 52 is configured and sized to mate with a rim 54. Each rim 54 is configured in the interior surface 24 and disposed such that each rim 54 is aligned with each female fitting 52 when the adapter halves 50a and 50b are connected and seated in the chamber 28. Each rim 54 is configured and sized such that the corresponding female fitting 52 receives the rim 54 when the adapter 50 is seated in the chamber 28 and the top and the bottom halves 12a are mated to close the housing 12.

The adapter 50 further includes each half 50a and 50b configured to provide an inner surface 57a having one or more protruding ridges 56, each ridge 56 traversing at least a portion of the inner surface 57 in a direction perpendicular to a length of the conduit 34. The ridges 56 of the inner surface 57 bias against a portion of the conduit 34 when the housing 12 and the one or more adapters 50 are clamped around the conduit 34. The ridges 56 essentially bite against or into the portion of the conduit 34 to help secure the housing 12 to the conduit 34. The ridges 56 help to prevent movement or slippage of the apparatus 10, e.g., little or no movement of the apparatus 10 when the housing 12 is clamped around the conduit 34 and an exposed cable. The ridges 56 help to immobilize the housing 12, thereby helping to prevent air loss from the apparatus 10 and to reduce a risk of damage to the exposed cable during clamping of the housing 12 and use of the apparatus 10.

The adapter 50 further includes a channel 58a and a gasket 58b combination disposed and configured in mating surfaces 50c and 50d of the adapter halves 50a and 50b. As shown in FIG. 8, the gasket 58b is disposed between a first mating surface 50c of one adapter 50b and a second mating surface 50d of the other adapter 50a and received by the channel 58a defined by the first mating surface 50c.

As shown in FIG. 7A, the adapter 50 is further configured to provide an inner surface 57a disposed substantially adjacent to a terminal end of each half 50a and 50b of the adapter 50 and proximate to the chamber 28 when the housing 12 is clamped over the conduit 34. The inner surface 57a receives or mates with an innerduct gasket 59. The innerduct gasket 59 is disposed between the inner surface 57a of the adapter 50 and the portion of the conduit 34 to which the housing 12 is clamped around. When the housing 12 and the adapter 50 is clamped around the portion of the conduit 34, the innerduct gasket 59 helps to prevent or at least helps to minimize air loss from the apparatus 10 at the interface of the adapter 50 and the conduit 34. The innerduct gasket 59 is constructed of material suitable for resisting deforming when the adapter 50 and the portion of the conduit 34 bias against the innerduct gasket 59 when the securing mechanism 20 is engaged to secure the housing 12 in a closed position.

Figure 8A:
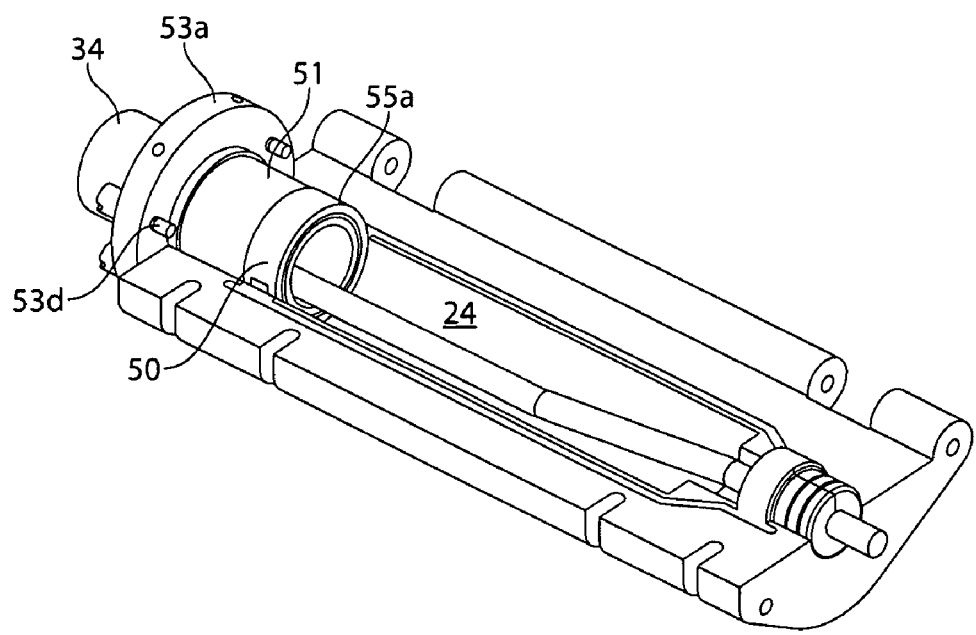
FIG. 8A is a perspective interior view of a portion of the second or bottom coupling half of the housing shown in FIGS. 1–2 with an adapter coupled to a portion of the conduit containing the cable.
Figure 8B:
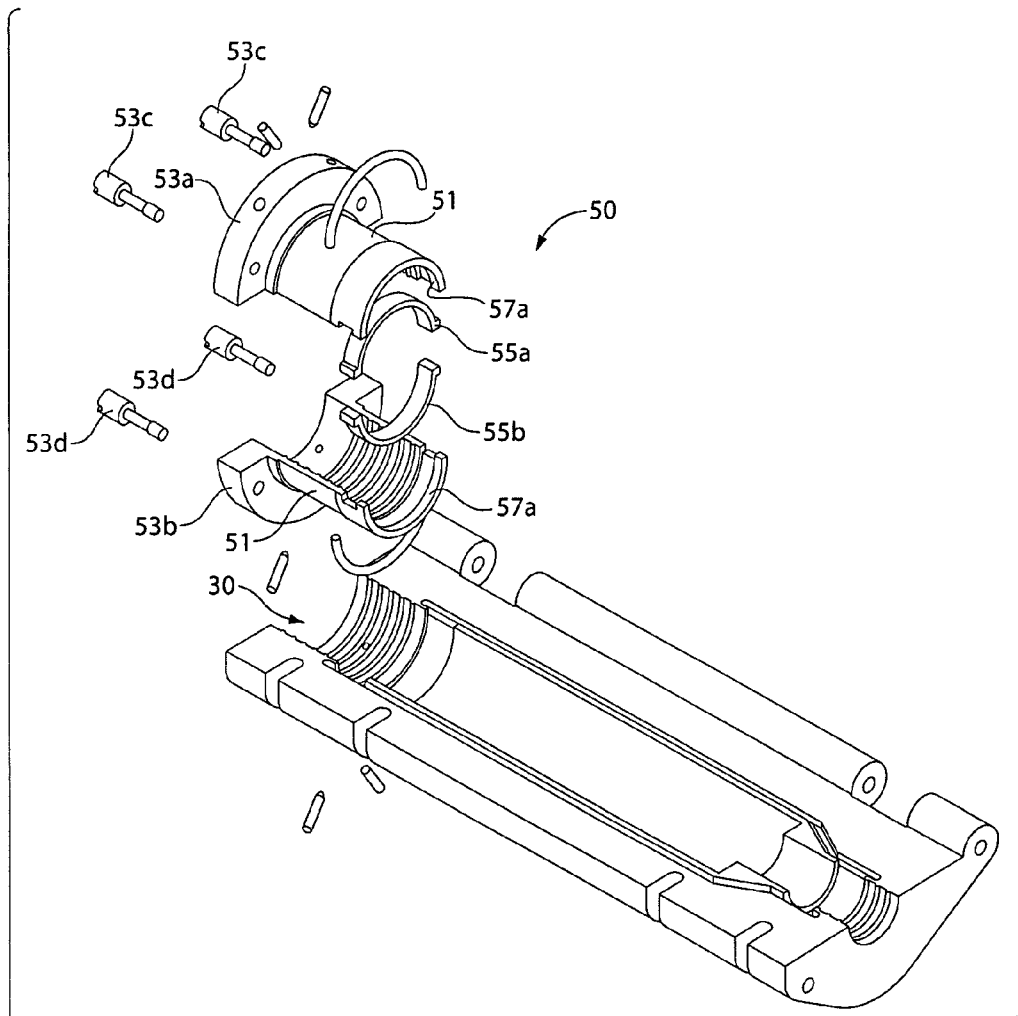
FIG. 8B is an exploded perspective view of the adapter shown in 8A.

Referring to FIGS. 8A–8B, in another aspect, the outer surface 51 of the adapter 50 is smooth, e.g., does not include such configurations as the female fittings 52. Each half 50a and 50b of the adapter 50 further includes a semi-circular shaped flange 53a and 53b. The flange 53a and 53b is configured such that when the adapter 50 is seated in the chamber 28, the flange 53a and 53b extends from each half 50a and 50b of the adapter 50 at the innerduct end 30 of the housing 12. The flange 53a and 53b is disposed and configured to couple with an end of a conduit. The flange 53a and 53b is further disposed and configured to permit the adapter 50 to surround and to enclose around a portion of a conduit such that the housing 12 is coupled to the conduit. The flange 53a and 53b is also configured to permit the adapter 50 to mount with a terminal end of the conduit to couple the housing 12 to the conduit. Each flange 53a and 53b includes one or more bore holes. Each bore hole is configured to receive a connector or fastener 53c and 53d, e.g., a screw or a rivet, to secure the flange to the housing 12 when the adapter 50 is seated in the chamber 28 and the first and the second coupling halves 12a and 12b are mated.

In this aspect, the adapter 50 further includes an adapter seal 55a and 55b disposed and configured to mate with the interior surface 57a of each adapter half 50a and 50b when the adapter 50 is seated in the chamber 28 and the first and second coupling halves 12a and 12b are mated. When the apparatus 10 is installed on a conduit, the adapter seal 55a and 55b is disposed anterior to the chamber 28 and between the interior surface 57a of the adapter 50 and an outer surface of the conduit. The adapter seal 55a and 55b helps to form a seal between the inner surface 57a of the adapter 50 and the outer surface of the conduit. The seal is substantially airtight and, as described above, helps to prevent air loss from the housing 12 and helps to secure the housing 12 to a conduit during use of the apparatus 10.

The adapter 50 is constructed of a material suitable for use under moist conditions or in the presence of water, and/or in cold temperatures. Suitable materials include, but are not limited to, metals, e.g., stainless steel or aluminum, plastic, e.g., reinforced plastic or combinations thereof. The adapter 50 when seated in the chamber 28 helps to accommodate the different diameters of conduit to which the apparatus 10 is coupled.

Figure 9A:
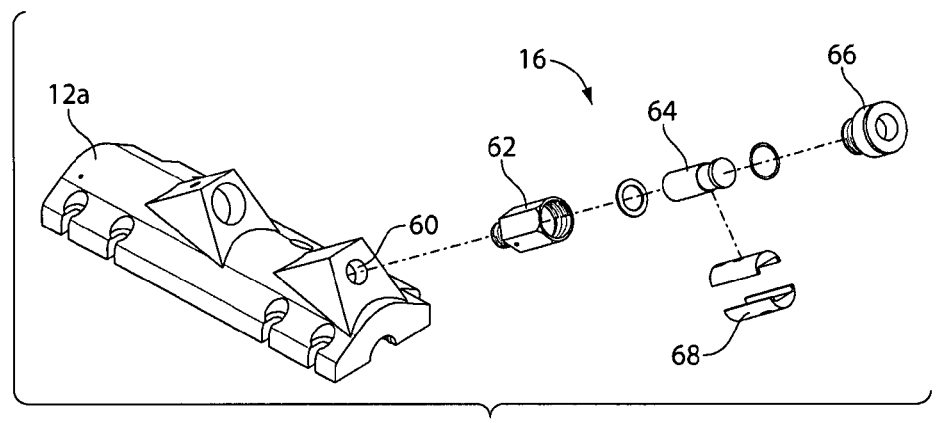
FIG. 9A is an exploded perspective view of an inlet valve assembly.
Figure 9B:
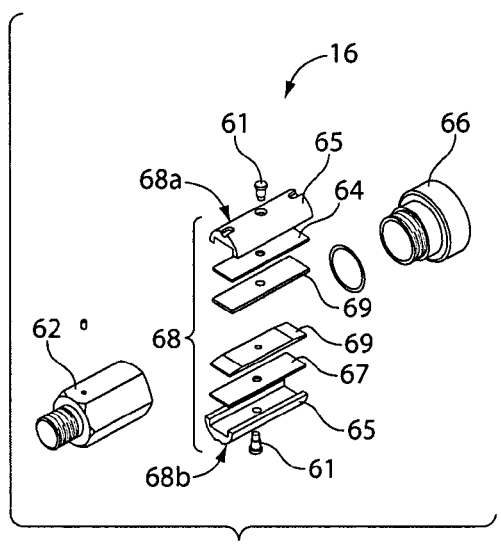
FIG. 9B is an exploded perspective view of the inlet valve assembly shown in FIG. 9A with an inlet seal.

Referring to FIGS. 3 and 9a, in one aspect, the apparatus 10 further comprises the inlet valve assembly 16 constructed and arranged to facilitate a supply of an elongated material, e.g., a cable or a detectable tape, into the apparatus 10 for application of the elongated material into an innerduct of a conduit. The inlet valve assembly 16 includes an inlet body 62 configured to couple with the port 60 in the top coupling half 12a of the housing 12, an inlet plug 64 configured such that an open terminal end of the inlet body 62 removably receives at least a portion of the inlet plug 64, and an inlet cap 66 configured to removably connect to an open terminal end of the inlet plug 64.

The inlet body 62 has a substantially cylindrical body and a terminal portion configured, e.g., threaded, to removably connect, e.g., via a complementarily threaded interior surface of the port 60, to the housing 12. The inlet plug 64 has a substantially cylindrical member configured such that the inlet plug 64 is received and contained by the inlet body 62. As shown in FIG. 3, the inlet body 62 is configured such that it slidably receives and securely contains the inlet plug 64 to removably connect the inlet plug 64 to the housing 12. The inlet plug 64 serves to substantially seal the inlet body 62 and the port 60 when the inlet seal 68 is not disposed in the inlet body 62. The inlet plug 64 is configured to be interchange with the inlet seal 68, depending upon a mode of air supply provided to the housing 12.

The inlet seal 68 is constructed and arranged to guide an elongated material into the inlet valve assembly 16 and to supply the elongated material to the chamber 28 of the apparatus 10. The inlet seal 68 is configured such that the inlet body 62 slidably receives and securely contains the inlet seal 68. When contained by the inlet body 62, the inlet seal 68 is connected to the housing 12 and in fluid communication with the chamber 28 of the housing 12.

The inlet seal 68 includes a top portion 68a and a bottom portion 68b. The top and the bottom portions 68a and 68b are configured and arranged such that when the top portion 68a is mated with and secured to the bottom portion 68b, an elongated material, e.g., a tape, slidably passes between the top portion 68a and the bottom portion 68b and thereby is guided into the inlet valve assembly 16.

Each of the top portion 68a and the bottom portion 68b includes a housing 65, a plate 69 and a gasket 67 disposed between the housing 65 and the plate 69. When the top portion 68a is mated with the bottom portion 68b, the plate 69 of the top portion 68a is parallel and adjacent to the plate 69 of the bottom portion 68b. The plate 69 includes a narrow thickness of about 0.125 inches and is constructed of a metal, e.g., aluminum. The gasket 67 includes a narrow thickness of about 0.125 and is construct of a deformable material, e.g., rubber foam. The housing 65, the plate 69 and the gasket 67 are held together via a connector 61, e.g., a rivet, while the plate 69 and the gasket 67 are movably connected to the housing 65 to permit the plate 69 and the gasket 67 to pivot back and forth at the rivet 61.

The inlet cap 66 includes a portion configured, e.g., threaded, to removably connect, e.g., via a complementarily threaded interior surface, to the inlet body 62. The inlet cap 66 defines an interior width or diameter configured and sized to permit insertion of an elongated material therethrough.

The inlet seal 68 is configured to help prevent air loss from the housing 12 and thereby to help prevent loss of operating pressure during use of the apparatus 10. As noted above, the plate 69 and the gasket 67 are disposed and configured to be movably connected to each of the top and the bottom portions 68a and 68b of the inlet seal 68. The plate 69 and the gasket 67 are sufficiently movable to help facilitate an elongated material to be slidably inserted through the inlet valve assembly 16 into the housing 12, e.g., via pressurized air, while being disposed parallel and adjacent to each other in close proximity sufficient to prevent a substantial air loss. e.g., air loss from the housing 12 that would lower pressure of the housing 12 to below an appropriate operating pressure.

The inlet seal 68 is configured and sized to accommodate a configuration and a size of an elongated material being applied to a conduit. Further, the inlet body 62 and/or the inlet cap 66 can be configured and sized to accommodate varying sizes of the inlet seal 68 to removably connect the inlet seal 68 to the housing. The inlet seal 68 can include a length of from about 0.5 in. to about 12 in., and preferably about 3 inches, and can include a width of from about 0.25 inches to about 3 inches, and preferably about 1 inch.

When the inlet valve assembly 16 is mounted to the housing 12, the inlet seal 68 is in fluid communication with the chamber 28 of the housing 12. An elongated material is inserted, e.g., manually by an operator, into the inlet cap 66 and into the inlet seal 68. Depending upon a material of construction of an elongated material, and its consequent weight, flexibility or other physical characteristics, an elongated material can be further inserted through the port 60 into the chamber 28. Supplying pressurized air to the chamber 28 pressurizes the chamber 28 and forces an elongated material through the chamber 28 and into an innerduct of a cable. Depending on at which point an elongated material is inserted into the inlet valve assembly 16 or the chamber 28, the pressurized air can either draw the material inserted in the inlet valve assembly 16 into the chamber 28, and thereafter force the material into an innerduct, or the pressurized air can force the material inserted into the chamber 28 from the chamber 28 into an innerduct. As described in further detail below, the elongated material can be connected to a projectile that is configured to capture pressurized air in the chamber 28 such that the projectile is forced from the chamber 28 into an innerduct of a conduit, thereby pulling the attached elongated member through the innerduct.

For example, a detectable tape, e.g., a polyester fiber woven tape including metallic conductors, can be inserted into the inlet valve assembly 16 and through the port 60 into the chamber 28 of the housing. The detectable tape can require a means by which it is forced by pressurized air from the chamber 28 into an innerduct. As described below in further detail, a projectile can be attached to an end of the detectable tape and can be configured to respond to pressurized air, e.g., expand or inflate upon contact with pressurized air, such that the projectile captures the pressurized air and is forced or projected through an innerduct by the pressurized air, thereby pulling the detectable tape therethrough.

In another example, the elongated material can include a material requiring the projectile, e.g., a cable or a narrow "mini" cable duct. A cable or a "mini" cable duct can have dimensions such that the cable or the cable duct may require the projectile to pull the cable or the "mini" duct through the chamber 28 into an innerduct of a conduit.

Figure 10:
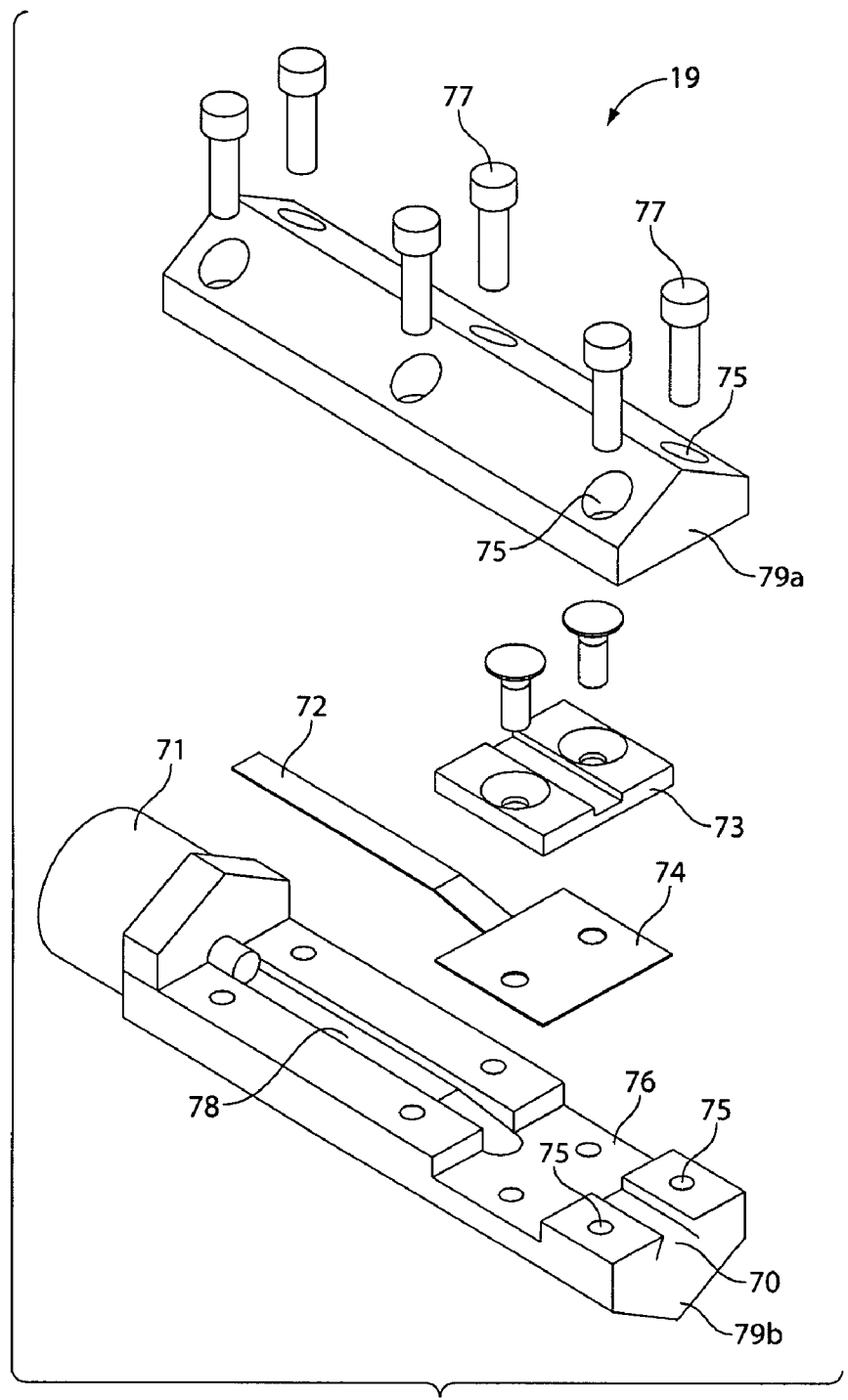
FIG. 10 is an exploded perspective view of an inlet valve assembly with a chamber and a baffle.

Referring to FIGS. 1–2 and FIG. 10, in another aspect, the inlet valve assembly 19 includes an alternative construction and arrangement. The inlet valve assembly 19 includes a top portion 79a and a bottom portion 79b that define, when mated, a throughput slot 70 and a valve chamber 78. As shown in FIG. 10, the top portion 79a can be secured to the bottom portion 79b by connectors 77, e.g., threaded screw-type connectors. Each connector 77 is received by a bore 75 in the top portion 79a and received by a corresponding threaded bore 75 in the bottom portion 79b aligned with the bore 75 of the top portion 79a. The chamber 78 contains a baffle plate 72 that is anchored within the assembly 19 by a base plate 74 such that the baffle plate 72 resides within the chamber 78.

The assembly 19 further includes an adapter 71 disposed at a terminal end of the assembly 16 and configured to facilitate insertion of the assembly 19 into a port 60 provided by the top coupling half 12a of the housing 12, as shown in FIGS. 1–2. The port 60 is disposed and configured to receive the assembly 16 such that the throughput slot 70 and the valve chamber 78 are in fluid communication with the chamber 28 of the housing 12. The port 60 can be provided at an angle relative to the top coupling half 12a to help facilitate insertion of the detectable tape into the throughput slot 70 and the valve chamber 78. The adapter 71 is further configured and sized to removably connect the inlet valve assembly 19 to the housing 12. An interior surface of the adapter 71 and an interior surface of the port 60 are substantially smooth, e.g., substantially devoid of edges, scratches or particulates, to help to facilitate movement of a detectable tape through the inlet valve assembly 19 and through the port 60 into the chamber 28 of the housing 12. Other configurations and arrangements of the assembly 19 and the port 60 are within the scope of the invention.

The slot 70 and the chamber 78 are configured and sized substantially similar to a material to be applied to a cable. The size and configuration of the slot 70 and the chamber 78 help to facilitate a good fit of the material, e.g. a detectable tape, while allowing the material to slide through the slot 70 and the chamber 78 for insertion into the chamber 28 of the housing 12. The slot 70 and the chamber 78 can include slightly larger dimensions than the material to help permit the material to pass through the slot 70 and the chamber 78 when drawn into the chamber 28 of the housing 12. As shown in FIG. 10, the slot 70 and the chamber 78 are elongated and have a rectangular cross-section substantially similar to a detectable tape. The chamber 78 can include a length of from about 0.5 in. to about 12 in., and preferably about 3 inches, and can include a width of from about 0.25 inches to about 3 inches, and preferably about 1 inch.

As shown in FIG. 10, the baffle 72 is an elongated member attached to a base plate 74. The base plate 74 is anchored by a top plate 73 to a surface 76 of the valve chamber 78 near the throughput slot 70 to securely seat the baffle 72 in the chamber 78. The elongated member of the baffle 72 can include an angle, e.g., a bend or crease. When the baffle 72 is securely seated in the valve chamber 78, the baffle 72 is disposed at a narrow angle and is oriented in relation to the throughput slot 70 to permit a detectable tape to thread over the baffle 72. When a portion of a detectable tape is inserted into the throughput slot 70, attached to a projectile, and pressurized air is supplied to the chamber 28 of the housing 12, the detectable tape is pulled through the throughput slot 70 and is carried over the baffle 72 into the chamber 28. The baffle 72 is constructed of a material suitable for producing a flexible and strong member that can deflect in response to air, can withstand a constant friction as the detectable tape slides through the inlet valve assembly in contact with the baffle 72 and can be easily installed. Suitable materials include, but are not limited to, a metal, e.g., aluminum.

As noted above, when the assembly 19 is mounted to the housing 12, the slot 70 and the valve chamber 78 are in fluid communication with the chamber 28 of the housing 12. A detectable tape or other elongated material can be inserted into the slot 70. Supplying pressurized air to the chamber 28 pressurizes the chamber 28 and creates a drawing action that forces the projectile through the chamber 28 which action pulls the elongated material through the slot 70 into the valve chamber 78 toward the chamber 28 of the housing 12.

The throughput slot 70 can be further configured with a narrow, low tolerance to help to prevent or to at least minimize/reduce air loss from the apparatus 10 at the cable end 32 of the housing 12 when the apparatus is in use and the housing 12 is pressurized.

The inlet valve assembly 19 is disposed and configured to help prevent or to at least minimize/reduce air loss from the apparatus 10 through the inlet valve assembly 16. The cable end 32 of the housing 12 and the throughput slot 70 are areas that present the greatest potential for air loss from the apparatus 10. Preventing or at least minimizing/reducing air loss from these areas, therefore, is important to effective performance of the apparatus 10.

Referring to FIGS. 3, the apparatus further includes the air valve assembly 14 to supply pressurized air to the chamber 28. The air valve assembly 14 is disposed anterior to the inlet valve assembly 16 and includes an air valve 82 coupled to a pressure gage and an air pipe 84 configured to removably connect to an external supply of compressed air. The air valve assembly 14 is configured and arranged to connect to a port 80 machined in the top coupling half 12a of the housing 12. The port 80 can include a threaded surface, e.g., a threaded interior surface, to receive a portion of the air valve 82 complementarily threaded such that the portion of the air valve 82 can thread into the port 80 to removably connect the air valve 82 to the housing 12. Similarly, a portion of the air pipe 84 can include a threaded surface to thread to a complementarily threaded surface of the air valve 82 to removably connect the air pipe 84 to the air valve 82. The air pipe is further configured to removably attach to an air hose for connection a pressurized air source. The air pipe 82 and the air valve 84 are configured and disposed for fluid communication with the chamber 28.

An air guide 86 can be disposed in the chamber 28 at an entry point of the port 80 into the chamber 28. The air guide 86 can be connected to the interior surface 24 of the housing 12 such that it is proximate to the port 80 and thereby proximate to pressurized air being supplied through the port 80. The air guide 86 is configured to help guide the pressurized air in a direction anterior to the inlet valve assembly 16 and 19. As shown in FIG. 3, the air guide can include an angled, planar surface facing the port 80 in order to help deflect pressurized air.

As shown in FIG. 1–4, the port 80 is constructed and arranged in the housing 12 such that the air valve assembly 14 is connected to the housing 12 at an angle and anterior to the inlet valve assembly 16. The position and the orientation of the air valve assembly 14 in relation to the inlet valve assembly 16 permits the air valve assembly 14 to supply pressurized air to the chamber 28 in front of the inlet assembly 16. Supplying pressurized air in front of the inlet assembly 16, and thereby in front of a detectable tape progressing through the inlet assembly 16, permits the air valve assembly 14 to supply air along a path of least resistance.

Referring to FIG. 2, a safety valve 11 is provided and configured for removable connection to the housing 12. The safety valve 11 serves as a device that activates when a pressure within the chamber 28 of the housing 12 rises above a certain pressure at which the safety valve 11 is rated. The safety valve 11 activates by releasing a top portion of its housing to release pressure from within the chamber 28. During use of the apparatus 10, should a pressure within the chamber 28 rise above a certain desired pressure, e.g., a pressure rating of the safety valve 11, the safety valve will release the top portion to vent excess pressure from the apparatus 10.

Figure 11A:
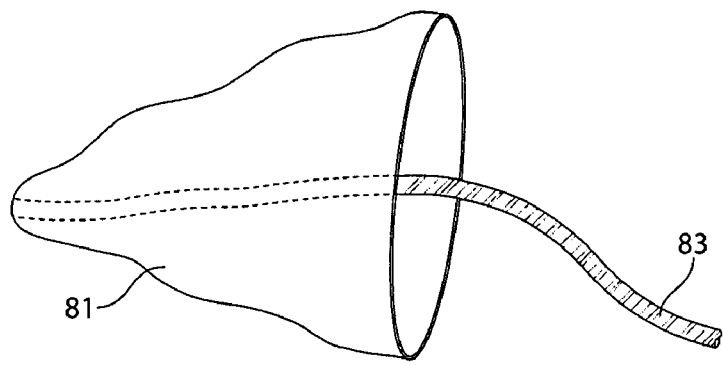
FIG. 11A is a perspective view of a projectile connected to a tape.
Figure 11B:
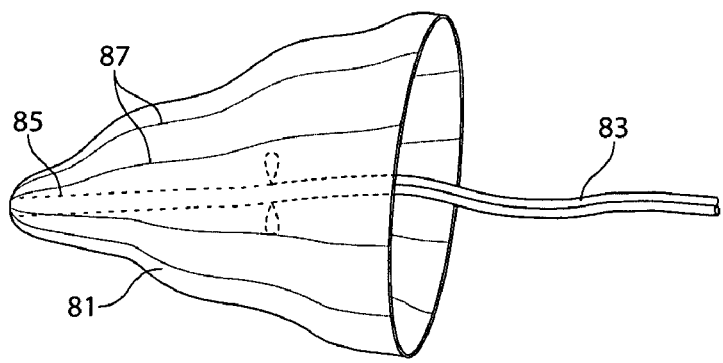
FIG. 11B is a perspective view of the projectile shown in FIG. 11A connected to a rod connected to a tape.
Figure 11C:
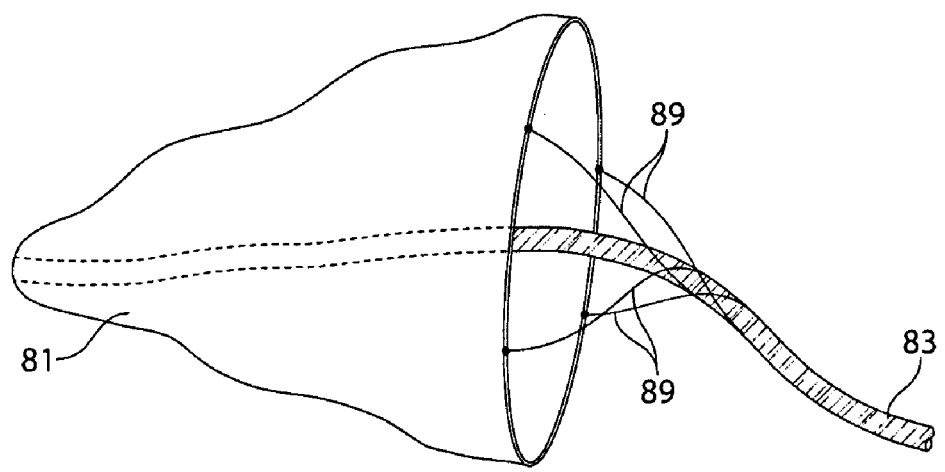
FIG. 11C is a perspective view of the projectile shown in FIG. 11A including a plurality of cords.

Referring to FIGS. 11A–11C, the apparatus 10 can be used in combination with an innerduct projectile 81. The innerduct projectile connects to a material 83, e.g., a detectable tape, to be applied to a conduit and serves as a means to help pressurized air force the detectable tape 83 through the chamber 28 and into an innerduct of a conduit to thereby apply the detectable tape 83 to the conduit. Air pressure supplied to the chamber 28 forces the innerduct projectile 81, with the detectable tape 83 attached, from the chamber 28 and into an innerduct.

As shown in FIGS. 11A–11C, the innerduct projectile 81 includes a shape, e.g., a cone shape or a parachute shape, to expand or to enlarge in response to contact with pressurized air and to thereby capture the pressurized air. A force of the pressurized air in contact with the projectile causes the projectile to progress through the chamber 28 and into an innerduct of a conduit.

As shown in FIG. 11B, the projectile 81 can further include an attachment rod 85 to connect a detectable tape to the projectile 81. The projectile 81 can further include one or more reinforcing members 83, e.g., rigid threads, along its length to help provide strength to the projectile 81 and to help enable the projectile 81 to retain its shape when forced through the chamber 28 and an innerduct.

As shown in FIG. 11C, the projectile 81 can also include one or more cords 89 connected at one end to an edge of the projectile 81 and connected at another end to the detectable tape 83. When the projectile 89 expands in response to contact with pressurized air, the cords 89 help the projectile 81 retain its position and its shape such that the projectile 81 can capture the pressurized air and help the detectable tape progress through an innerduct. The cords 89 help to prevent the projectile 89 from inverting in response to the pressurized air, which can inhibit the progression of the detectable tape through a conduit.

Figure 12:
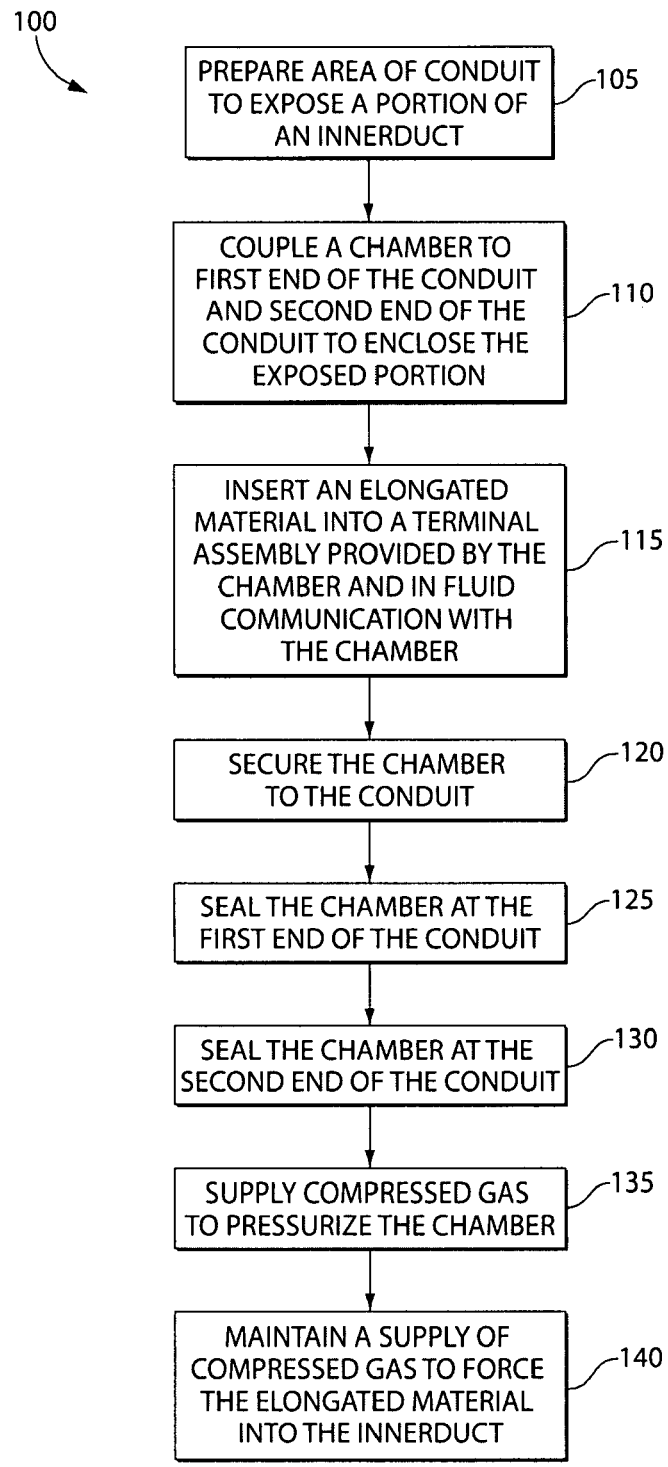
FIG. 12 is a flow block diagram of a method for applying a material to a cable or into a conduit.

In operation, referring to FIG. 12, with further reference to FIG. 3, a process 100 for applying a material, e.g., a detectable cable tape having a metallic component, into a conduit or cable, e.g., an underground dielectric cable includes the stages shown. The process 100, however, is exemplary only and not limiting. The process 100 can be altered, e.g., by having stages added, removed or rearranged.

At stage 105, an area of a conduit is prepared, e.g., splicing the conduit and/or removing a portion of the conduit jacket sufficient to expose a portion of a cable 36 contained therein, such that a detectable tape can be inserted into an innerduct 31 of the conduit 34.

At stage 110, the apparatus 10 couples to the prepared area of the conduit 34 such that the chamber 28 encloses the area and, in particular, a portion of the exposed cable 36. The chamber 28 couples at a first end of the area to the conduit 34 and couples at a second end of the area to the cable 36 extending through the conduit 34.

At stage 1 15, the detectable tape is threaded into the inlet valve 68 and through the port 60, and thereafter connected to the projectile 81.

At stage 120, the closing mechanism 20 is engaged to securely connect the first and the second coupling halves 12a and 12b of the housing 12.

At stage 125, the chamber 28 at the first end, e.g., the innerduct end 30, is sealed, e.g., with the adapter 50 disposed and configured to fill a space between the interior surface 24 of the chamber 28 and an outer surface of the conduit 34, to effect a substantially airtight seal, as described herein, between the housing 12 and the conduit 34. The first end of the area of the conduit 34 includes a conduit jacket enclosing a cable 36 contained in the innerduct 31.

At stage 130, the chamber 28 at the second end, e.g., the cable end 32, is sealed, e.g., with the gasket 42 disposed and configured to fill a space between the interior surface 24 of the chamber 28 and an outer surface of the cable 36. A substantially airtight seal, as described herein, between the housing 12 and the. cable 36 is produced.

At stage 135, the air valve assembly 14 supplies pressurized air to the chamber 28 to pressurize the chamber 28. Pressurized air, is delivered into the chamber 28 anterior to the inlet valve assembly 16 to supply air in front of the inlet assembly 16. Air pressure within the chamber 28 helps to force the projectile 81 through the chamber 28 and into the innerduct 31. Pressurized air is supplied to the chamber 28 in a range of from about 5 psi to about 125 psi, and preferably about 80 psi.

At stage 140, the application of the pressurized air to the chamber 28 is maintained such that the pressurized air in the chamber 28 forces the projectile 81 through the innerduct 31 between the conduit 34 and the cable 36.

Figure 13:
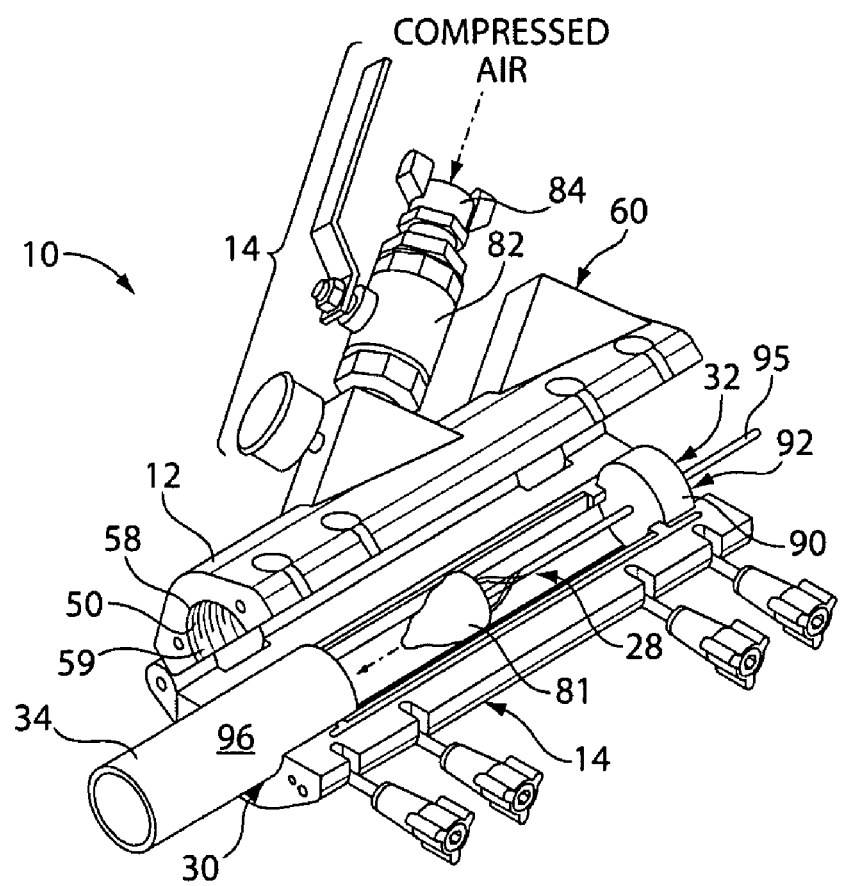
FIG. 13 is a perspective view of the projectile shown in FIG. 11C inserted into the apparatus shown in FIGS. 1–3 to apply a cable into an innerduct of a conduit.

Referring to FIG. 13, in another aspect, the apparatus 10 according to the invention, is provided for installing a cable or a narrow "mini" cable duct 95 to an occupied or unoccupied conduit innerduct 96. A narrow "mini" cable duct 95 can include an innerduct having a narrow diameter less than a diameter of an innerduct of a conduit. A cable can be installed into the "mini" duct 95 before or after the duct 95 has been installed into the conduit innerduct. One or more narrow ducts 95 can be installed into a conduit innerduct for applying one or more cables to the conduit through the cable open end 32 of the housing 12.

In this context, the port 60 provided by the housing 12 disposed and configured to receive the air inlet assembly 16 is sealed, e.g., using the inlet plug 64, or eliminated from the housing 12. The open cable end 32 serves as an entry point into an innerduct of a conduit to insert and to install a cable to an innerduct. The open cable end 32 can include a gasket 90 disposed at an interior surface of the housing 12 adjacent to the cable end 32. The gasket 90 is configured to seat in a groove (not shown) machined in the interior surface 24 of each of the top and the bottom coupling halves 12a and 12b adjacent to the cable end 32. Each groove includes a size and a shape to receive a portion of the gasket 90. Each groove is aligned in the interior surface 24 with another groove. When the gasket 90 is seated in the grooves and the apparatus 10 is closed, the top and the bottom coupling halves 12a and 12b couple and the grooves and the gasket 90 conform to and mate with an outer diameter of a cable 95. As shown in FIG. 13, the gasket 90 has a width sufficient to permit the gasket 90 to fill a volume or void, e.g., provide little or no room, between an inner diameter of the housing 12 and the outer diameter of the cable 95. The configuration and the orientation of the gasket 90 helps to form a substantially airtight seal, e.g., a seal that prevents all, at least most of or a substantial portion of air to remain within the housing 12.

If necessary to install the cable or the "mini" duct 95 into the innerduct 96, the cable or the "mini" duct 95 can be attached to the innerduct projectile 81 shown in FIGS. 11A–11C. Compressed air is supplied to the chamber 28 through the air inlet assembly 14 to pressurize the chamber 28. The pressurized air forces the projectile 81 and the cable or the duct 95 attached thereto from the chamber 28 into the innerduct 96. The apparatus 10 is constructed and arranged to force the projectile 81 with the cable or the "mini" duct 95 attached thereto over a span of the innerduct 96, e.g. including a distance or a span of from 5 feet to 10, 000 feet.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An apparatus for feeding an elongated member into an interior of a conduit through an end portion of the conduit, the apparatus comprising:

a housing defining a chamber therein with a central axis, the housing including a first coupling housing and a second coupling housing, the first coupling housing being connected to the second coupling housing via a hinge mechanism disposed along one side of the housing such that the first and the second coupling housings pivot about the hinge mechanism to open and to close the housing about an end portion of the conduit;

the housing having a first end along the central axis which defines an opening configured to couple to a first end portion of the conduit;

the housing having a second end along the central axis disposed opposite to the first end which defines an opening configured to couple to a second end portion of the conduit opposite to the first end portion of the conduit;

a seal assembly disposed along an outer surface of the housing external to the chamber and in a first port defined in the housing, the seal assembly being configured to provide an area external to the housing in fluid communication with the chamber, the seal assembly being further configured with at least one opening to receive the elongated member into the seal assembly and thereafter into the chamber and into the interior of the conduit; and a gas supply assembly disposed along an outer surface of the housing external to the chamber and in a second port defined in the housing anterior to and in linear alignment with the first port such that the seal assembly and the gas supply assembly are disposed in linear alignment relative to one another and the gas supply assembly is disposed anterior to the seal assembly, the gas supply assembly being disposed and configured to supply gas under pressure to the chamber from a gas source.

2. The apparatus of claim 1 wherein the seal assembly is configured and arranged to prevent loss of pressurized gas from the chamber.

3. The apparatus of claim 1 wherein the seal assembly includes a gasket defining the opening.

4. The apparatus of claim 3 wherein the gasket is deformable.

5. The apparatus of claim 1 wherein the elongated member includes a hollow member.

6. The apparatus of claim 1 wherein the elongated member includes a tubular member.

7. The apparatus of claim 1 wherein the elongated member includes one of a cable and a duct.

8. The apparatus of claim 7 wherein the duct contains a cable.

9. The apparatus of claim 7 wherein the duct defines an inner space sized to receive one of a cable and a second duct.

10. The apparatus of claim 1 wherein the opening in the seal assembly is configured and sized to substantially conform to a configuration and size of the elongated member and is further configured to slidably receive the elongated member.

11. The apparatus of claim 10 wherein the opening has a circular cross-section and the elongated member is one of a cable and a duct.

12. The apparatus of claim 10 wherein the opening has a rectangular cross-section and the elongated member is a tape.

13. The apparatus of claim 1 wherein the end of the elongated member fed into the interior of the conduit is attached to a projectile and wherein the opening in the seal assembly is configured to receive the projectile attached to the elongated member into the chamber and into the interior of the conduit.

14. The apparatus of claim 13 wherein the projectile is constructed of a material that permits the projectile to flatten.

15. The apparatus of claim 14 wherein the projectile is disposed and configured to open and to expand in response to contact with pressurized gas supplied to the chamber.

16. The apparatus of claim 1 wherein the seal assembly further includes an inlet seal constructed and arranged to receive and to guide the elongated member into the chamber.

17. The apparatus of claim 16 wherein the inlet seal defines an interior configuration to slidably feed the elongated member into the chamber and into the conduit when pressurized air is supplied to the chamber.

18. The apparatus of claim 16 wherein the inlet seal is further constructed and arranged to help to prevent air loss from the housing and to help to prevent loss of operating pressure from the housing.

19. An apparatus for feeding an elongated member into an interior of a conduit through an end portion of the conduit, the apparatus comprising:

a housing defining a chamber therein, the chamber terminating at one end of the housing into a first end defining an opening configured to couple to a first end portion of the conduit;

the chamber terminating at another end of the housing into a second end disposed opposite to the first end defining an opening configured to at least one of: (i) couple to a second end portion of the conduit and (ii) receive a first sealing assembly, the first sealing assembly being configured to seal the second end, and being further configured to provide an area external to the housing in fluid communication with the chamber and to receive the elongated member and to feed the elongated member into the chamber;

a gas supply assembly disposed along an outer surface of the housing external to the chamber and in a first port defined in the housing, the gas supply assembly being configured to supply gas under pressure to the chamber from a gas source; and a second port defined in the housing and disposed posterior to and in linear alignment with the first port such that the gas supply assembly and a second sealing assembly are disposed in linear alignment relative to one another and the second sealing assembly is disposed posterior to the gas supply assembly when the second sealing assembly is disposed along an outer surface of the housing external to the chamber and in the second port.

20. The apparatus of claim 19 wherein at least one of the seal first and the second sealing assembly is configured and arranged to prevent loss of pressurized gas from the chamber.

21. The apparatus of claim 19 wherein at least one of the first and the second sealing assembly includes a gasket defining an opening.

22. The apparatus of claim 21 wherein the gasket is deformable.

23. The apparatus of claim 19 wherein the elongated member includes a hollow member.

24. The apparatus of claim 19 wherein the elongated member includes a tubular member.

25. The apparatus of claim 19 wherein the elongated member includes one of a cable and a duct.

26. The apparatus of claim 25 wherein the duct contains a cable.

27. The apparatus of claim 25 wherein the duct defines an inner space sized to receive one of a cable and a second duct.

28. The apparatus of claim 19 wherein at least one of the first sealing assembly and the second sealing assembly defines an opening is configured and sized to substantially conform to a configuration and size of the elongated member and is further configured to slidably receive the elongated member.

29. The apparatus of claim 28 wherein the opening has a circular cross-section and the elongated member is one of a cable and a duct.

30. The apparatus of claim 28 wherein the opening has a rectangular cross-section and the elongated member is a tape.

31. The apparatus of claim 19 wherein the end of the elongated member fed into the interior of the conduit is attached to a projectile and wherein at least one of the the first sealing assembly and the second sealing assembly defines an opening configured to receive the projectile attached to the elongated member into the chamber and into the interior of the conduit.

32. The apparatus of claim 31 wherein the projectile is constructed of a material that permits the projectile to flatten.

33. The apparatus of claim 32 wherein the projectile is disposed and configured to open and to expand in response to contact with pressurized gas supplied to the chamber.

34. The apparatus of claim 19 wherein at least one of the first and the second sealing assembly further includes an inlet seal constructed and arranged to receive and to guide the elongated member into the chamber.

35. The apparatus of claim 34 wherein the inlet seal defines an interior configuration to slidably feed the elongated member into the chamber and into the conduit when pressurized air is supplied to the chamber.

36. The apparatus of claim 34 wherein the inlet seal is further constructed and arranged to help to prevent air loss from the housing and to help to prevent loss of operating pressure from the housing.

37. The apparatus of claim 19, wherein the second sealing assembly being configured to provide an area external to the housing in fluid communication with the chamber and to receive the elongated member and to feed the elongated member into the chamber.

38. An apparatus for feeding an elongated member into an interior of a conduit through an end portion of the conduit, the apparatus comprising:

a housing defining a chamber therein;

the housing having a first open end and a second opposite open end defined along each terminal end of the chamber, each of the first and the second open ends being configured to couple to a first and a second portion of the conduit, respectively;

a sealing assembly disposed along an outer surface of the housing external to the chamber and in a first port defined in the housing, the sealing assembly being configured with at least one opening configured to provide fluid communication with the chamber and to receive the elongated member; and a gas supply assembly disposed along the outer surface of the housing external to the chamber and in a second port defined in the housing anterior to and in linear alignment with the first port such that the sealing assembly and the gas assembly are disposed in linear alignment relative to one another and the gas supply assembly is disposed anterior to the sealing assembly, the gas supply assembly being configured to supply gas under pressure to the chamber from a gas source.

* * * * *

UNITED STATES PATENT AND TRADEMARK OFFICE
CERTIFICATE OF CORRECTION

| | | |
|---|---|---|
| PATENT NO. | : 7,225,533 B2 | Page 1 of 1 |
| APPLICATION NO. | : 10/285769 | |
| DATED | : June 11, 2006 | |
| INVENTOR(S) | : Sylvia et al. | |

It is certified that error appears in the above-identified patent and that said Letters Patent is hereby corrected as shown below:

Claim 28, col. 18 line 67 delete the word "is".

Claim 31, col. 19 line 12 delete the word "the" after the word "of".

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,225,533 B2 Page 1 of 1
APPLICATION NO. : 10/285769
DATED : June 5, 2007
INVENTOR(S) : Sylvia et al.

It is certified that error appears in the above-identified patent and that said Letters Patent is hereby corrected as shown below:

Claim 28, col. 18 line 67 delete the word "is".

Claim 31, col. 19 line 12 delete the word "the" after the word "of".

This certificate supersedes Certificate of Correction issued July 31, 2007.

Signed and Sealed this

Twenty-first Day of August, 2007

JON W. DUDAS
*Director of the United States Patent and Trademark Office*